(No Model.)

F. A. MUELLER.
SHAFT OR AXLE BEARING.

No. 570,040.　　　　　　　　Patented Oct. 27, 1896.

WITNESSES:　　　　　　　　　　　　　　INVENTOR
H. B. Nealy.　　　　　　　　　Frederick A. Mueller
J. A. Walsh.　　　　　　　　　By Chester␣Bradford,
　　　　　　　　　　　　　　　　　　　ATTORNEY.

UNITED STATES PATENT OFFICE.

FREDERICK A. MUELLER, OF INDIANAPOLIS, INDIANA.

SHAFT OR AXLE BEARING.

SPECIFICATION forming part of Letters Patent No. 570,040, dated October 27, 1896.

Application filed August 4, 1896. Serial No. 601,657. (No model.)

*To all whom it may concern:*

Be it known that I, FREDERICK A. MUELLER, a citizen of the United States, residing at Indianapolis, in the county of Marion and State of Indiana, have invented certain new and useful Improvements in Shaft or Axle Bearings, of which the following is a specification.

The object of my said invention is to provide a bearing similar in certain respects to an ordinary pin or roller bearing, but in which the pins or rollers shall be held separate from each other, so that there shall be no friction between them, and in which the several parts shall be so constructed as to provide convenient and accurate means of adjustment.

An axle-bearing embodying my said invention will be first fully described, and the novel features thereof then pointed out in the claims.

Figure 1:
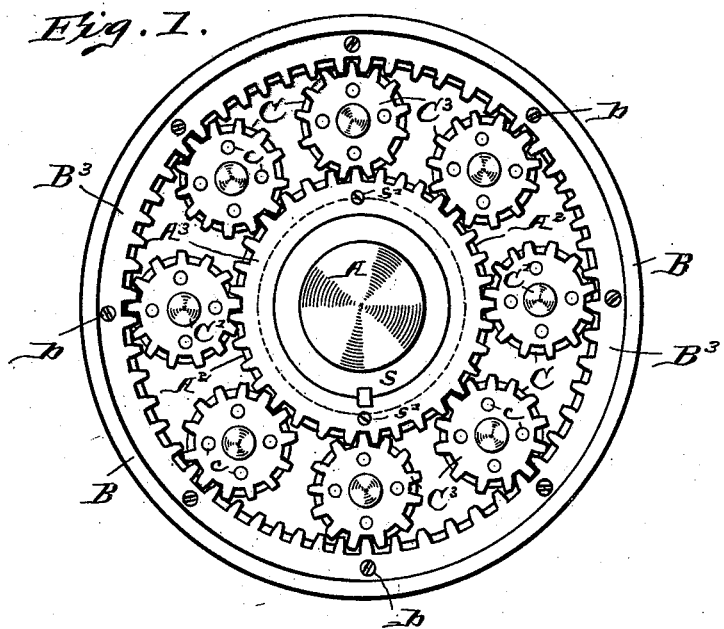
Figure 2:
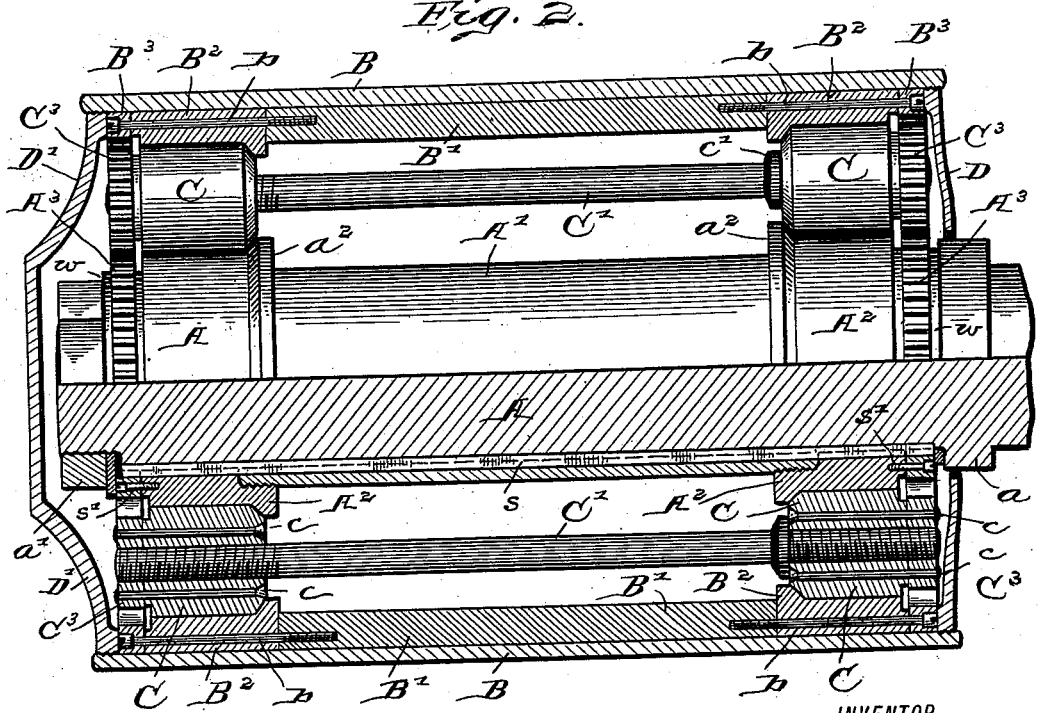

Referring to the accompanying drawings, which are made a part hereof, and on which similar letters of reference indicate similar parts, Figure 1 is an end elevation of such a bearing with the cap and nut removed; and Fig. 2, a view showing the hub or casing in section, with a part of the axle and supporting-rollers also in section, the remainder of said axle and rollers being in elevation, all parts beyond the line of sight being omitted for sake of clearness.

In said drawings the portions marked A represent the axle or shaft; B, the hub or bearing carrying said axle or shaft; C, the interposed rollers, and D D' dust-caps.

The shaft or axle A is in itself any ordinary shaft or axle for any vehicle or piece of machinery. In the form shown it has a collar or flange $a$ at one end and a nut $a'$ at the other end. It is surrounded by a sleeve A', at the ends of which are bearing-collars $A^2$, which are provided with flanges $a^2$. The parts A' and $A^2$ are united by recessing the part $A^2$ and providing the recesses with interior screw-threads, into which the exteriorly-screw-threaded ends of the part A' enter, as indicated in the lower part of Fig. 2. By this means the aggregate length of the three parts constituting the complete sleeve may be varied somewhat and accuracy of adjustment of the bearing-surfaces thus secured. To the outer ends of the parts $A^2$ are secured gears $A^3$, the pitch-lines of which are coincident with the peripheries of said parts $A^2$. All these parts are secured from revolving upon the axle A by a suitable spline $s$, which preferably extends through from end to end of the structure, composed of the parts A' and $A^2$, as shown in Fig. 2. The gears $A^3$ are immediately secured to the collars $A^2$ by the screws $s'$. In assembling the parts washers $w$ are interposed between the collar or flange $a$ and the nut $a'$ and outer ends of the two gears $A^3$, respectively, as shown.

The hub or casing consists of the shell B and interior short cylinders B' and annular rings $B^2$, which form one side of the tracks or races for the rollers C, the other sides of which are formed by the collars $A^2$. Upon the outer ends of the rings $B^2$ are internally-toothed annular gear-rings $B^3$, with which the gears on the ends of the rollers C engage. The parts B', $B^2$, and $B^3$ are connected together by machine-bolts $b$. As will be readily seen, these parts may be disassembled easily when desired.

The rollers C are interposed between the collars $A^2$ and the annular tracks $B^2$ and are mounted upon shafts C'. At one end these shafts are provided with collars $c'$, against which the rollers C are tightly driven, while at the other end said rollers are free to be adjusted longitudinally of said shafts to any desired position. Both ends of said shafts are shown as screw-threaded to receive the rollers and gears, but manifestly this is necessary only at one end, where the adjustment is designed to take place. Upon the outer ends of these rollers C are secured the gears $C^3$, which mesh both with the gears $A^3$ on the ends of the collars $A^2$ and with the annular toothed rings $B^3$, all as shown most plainly in Fig. 1. These are preferably rigidly secured to the rollers C by rivets $c$, so that said rollers and said gears must revolve together.

The dust-caps D and D' close the openings that would otherwise exist in the ends of the hub and are preferably screwed in place, as shown.

In assembling this device the sleeve composed of the tube A' and collars $A^2$ is secured together in the desired relation. The parts B, B', and $B^2$ are also assembled, and the rollers C are placed on those ends of the shafts C' which carry the collars. Said shafts carrying said rollers are then inserted in place, and the rollers on the opposite ends of the shafts are screwed on until they reach the desired point of adjustment, so that the surfaces bear properly together. The gears $A^3$ and annular gear-rings $B^3$ are then put in place and secured, intermeshing with the other gears. The axle A is then slipped in through the sleeve and secured by means of the nut $a$. The dust-caps D and D' are then put in place, and the structure is assembled complete, ready for use.

I have not seen fit to describe or illustrate the form of wheel of which the outer casing B forms a part of the hub, as obviously it may be of any description and applicable to any use desired. The invention consists in the construction and arrangements of parts of the bearing whereby they are conveniently assembled and adjusted to do the required work. Obviously, by the arrangement shown said parts can be adjusted in relation to each other, as wear is required to be taken up, and with said construction there is only the required amount of bearing-surface, the central portions of the bearing being entirely separate from each other, with clear intervening spaces, and the only contact being at and near the ends.

Having thus fully described my said invention, what I claim as new, and desire to secure by Letters Patent, is—

1. The combination, in a bearing, of the axle; a sleeve on said axle composed of a central cylinder and two collars having screw-thread connections, whereby they are adjustably attached to each other, and gears connected to the outer ends of said collars; an exterior hub structure composed of a central portion, and annular rings or tracks secured together, and provided with internally-toothed gear-rings attached to the outer ends thereof; and rollers mounted on shafts and interposed between said collars and said annular tracks and adjustable upon their said shafts, with gears secured to the outer ends of said rollers and engaging with the gears on the collars and with the internally-toothed gear-rings, the whole being arranged and operating substantially as shown and described.

2. The combination, in a bearing, of a central sleeve having collars on the ends, said collars having flanges at their inner ends, an exterior structure having annular tracks at the ends thereof with flanges corresponding to those on the collars and registering therewith, and rollers mounted on shafts and located between said collars and said annular tracks and bearing against the flanges thereon, with gears connected to the ends of said several parts, whereby the relations between them are maintained, substantially as shown and described.

3. The combination, in a bearing, of an axle or shaft A having a collar $a$ and a nut $a'$ thereon, a sleeve on said axle collars $A^2$ at the ends of said sleeve, gears $A^3$ outside and connected to said collars, a casing or hub B having an interior sleeve B' with annular tracks $B^2$ secured to the ends thereof, annular interiorly-toothed gear-rings $B^3$ secured to the ends of said annular tracks, interposed rollers, and means for adjusting the several parts, whereby the desired contact between their surfaces may be secured, substantially as shown and described.

In witness whereof I have hereunto set my hand and seal, at Indianapolis, Indiana, this 1st day of August, A. D. 1896.

FRED. A. MUELLER. [L. S.]

Witnesses:
CHESTER BRADFORD,
JAMES A. WALSH.